(12) United States Patent
Ljungquist et al.

(10) Patent No.: US 6,837,537 B2
(45) Date of Patent: Jan. 4, 2005

(54) ARRANGEMENT FOR WEAKENING A CONSTRUCTION

(75) Inventors: Henrik Ljungquist, Gothenburg (SE); Lars Forsman, Torslanda (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/432,904

(22) PCT Filed: Dec. 7, 2001

(86) PCT No.: PCT/SE01/02706

§ 371 (c)(1),
(2), (4) Date: May 29, 2003

(87) PCT Pub. No.: WO02/47960

PCT Pub. Date: Jun. 20, 2002

(65) Prior Publication Data

US 2004/0032149 A1 Feb. 19, 2004

(30) Foreign Application Priority Data

Dec. 8, 2000 (SE) .............................. 0004541

(51) Int. Cl.$^7$ ............................................. B60R 27/00
(52) U.S. Cl. ............................ 296/187.09; 296/203.02; 296/193.09
(58) Field of Search ....................... 296/187.09, 203.02, 296/193.09; 293/4, 7, 117, 132, 133

(56) References Cited

U.S. PATENT DOCUMENTS

| 4,050,537 | A | | 9/1977 | Bez | |
|---|---|---|---|---|---|
| 5,311,963 | A | * | 5/1994 | Shigeoka et al. | 296/203.02 |
| 5,314,229 | A | * | 5/1994 | Matuzawa et al. | 296/187.09 |
| 5,460,421 | A | * | 10/1995 | Culbertson | 293/133 |
| 5,941,336 | A | * | 8/1999 | Saito et al. | 296/187.09 |
| 6,019,419 | A | * | 2/2000 | Browne et al. | 293/133 |
| 6,056,337 | A | * | 5/2000 | Oguri et al. | 296/187.09 |
| 6,113,178 | A | | 9/2000 | Faigle | |
| 6,286,895 | B1 | * | 9/2001 | Urushiyama et al. | 296/187.09 |
| 6,394,535 | B1 | * | 5/2002 | Kawamura et al. | 296/187.09 |
| 6,409,253 | B2 | * | 6/2002 | Larsson et al. | 296/187.09 |

FOREIGN PATENT DOCUMENTS

WO    WO 98/22327    5/1998

OTHER PUBLICATIONS

JP111171054 A, Hino Motors Ltd: "Connecting Structure of Cab to Chassis in Cab Tilting", Jun. 29, 1999.
JP11240463 A, Hino Motors Ltd: "Impact Absorbing System", Sep. 7, 1999.

* cited by examiner

Primary Examiner—Lori L. Coletta
(74) Attorney, Agent, or Firm—Young & Thompson

(57) ABSTRACT

An arrangement F(1,1',1") for weakening a structure (4,4', 12"), comprises at least one element (8,28) arranged at the structure (4,4',12") to affect its strength, a sensor (9) arranged to sense impact acting on the structure (4,4',12") and a control unit (10) disposed to, firstly, receive signals when the signal received from the sensor (9) agrees with a set value. The element (8,28) comprises an explosive charge (11), which is disposed to detonate when the control signal is emitted from the control unit (10). The explosive charge (11) is disposed at the element (8,28) in such a manner that the element (8,28) awakens the strength of the structure (4,4',12") when the explosive charge (11) detonates.

11 Claims, 4 Drawing Sheets

ARRANGEMENT FOR WEAKENING A CONSTRUCTION

BACKGROUND OF THE INVENTION

The present invention relates to an arrangement for weakening a structure, comprising at least one element, which is arranged at the structure to affect its strength, a sensor is arranged to sense impact acting on the structure and a control unit is arranged to, firstly, receive signals from the sensor and, secondly, emit a control signal when the signal received from the sensor agrees with a set value.

DESCRIPTION OF THE RELATED ART

In a frontal collision between a truck or bus and another truck, for example, the front portion of the cab, together with the instrument panel, may be pushed in towards the driver seat due to the enormous forces arising in a collision.

Trucks typically have a cab arranged on a vehicle frame or a chassi. The anchoring of the cab to the vehicle frame is, in certain truck designs, designed so that the cab will be at least partially separated from the vehicle frame in a head-on collision, so that the cab is pushed backwards. In this way, the cab front portion and the instrument panel are prevented from being pushed in and injuring the driver in the cab. Since the cab space will be essentially intact after the collision, the cab doors can still be opened, allowing the driver to get out of the cab.

It is previously known to let the cab separate from the vehicle frame by having one or more beams joining the cab to the vehicle frame be broken off during collision. To achieve this, each beam has a fracture indication dimensioned so that the beam is broken off when a certain force is applied to the beam. The beam must, however, also be dimensioned to withstand those stresses acting on the beam during the life of the truck, e.g. fatigue stresses. It is, however, difficult to dimension a beam so that it breaks off when subjected to a certain force in a collision, at the same time as it withstands fatigue stresses and forces arising during the everyday use of the truck.

Passenger cars are often designed so that the energy generated during collision is absorbed by one or more beams. These beams are commonly made hollow with a rectangular or square cross section. During a collision, the beam is compressed in its axial direction. Such a design is, however, difficult to apply to trucks.

Also previously known in trucks are structures comprising beams held together by a plurality of screws or rivets. In a collision, the screws or rivets are broken off by the collision force, and the truck cab is then displaced in the direction of the force. Thus, the truck cab is maintained essentially intact after the collision. It is, however, difficult to dimension the structure so that the screws or rivets are broken off when subjected to a certain force arising in a collision at the same time as the structure must be dimensioned so that it can resist fatigue stresses and forces arising during the everyday use of the truck.

SUMMARY OF THE INVENTION

It is a purpose of the present invention to achieve an arrangement for weakening on a special occasion, a structure made in such a way that the strength properties of the structure remain unaffected prior to said occasion.

This is achieved by an arrangement of the type described by way of introduction where said element comprising an explosive charge disposed to detonate when said control signal is emitted from the control unit, said explosive charge being arranged at the element in such a manner that the element weakens the strength of the structure when the explosive charge detonates. Such an arrangement means that the structure does not need to be dimensioned for fracture at a certain collision force, at the same time as the structure must be strong enough to withstand the forces arising during everyday use. By virtue of the fact that the element weakens the strength of the structure when an explosive charge detonates, the structure does not need to be dimensioned for fracture at those forces arising during collision.

According to one embodiment of the invention the element comprises a plurality of fasteners, such as screws, bolts or rivets which join a cab to a vehicle frame.

In a collision, the fasteners are basted off by the explosive charge. The fasteners can be dimensioned to withstand the forces arising during everyday use of the vehicle. Thus, the strength properties of the structure will be unaffected prior to a collision.

BRIEF DESCRIPTION OF THE DRAWINGS

The invention will be described in more detail below with reference to examples shown in the accompanying drawings, of which

DESCRIPTION OF THE PREFERRED EMBODIMENTS

Figure 1:
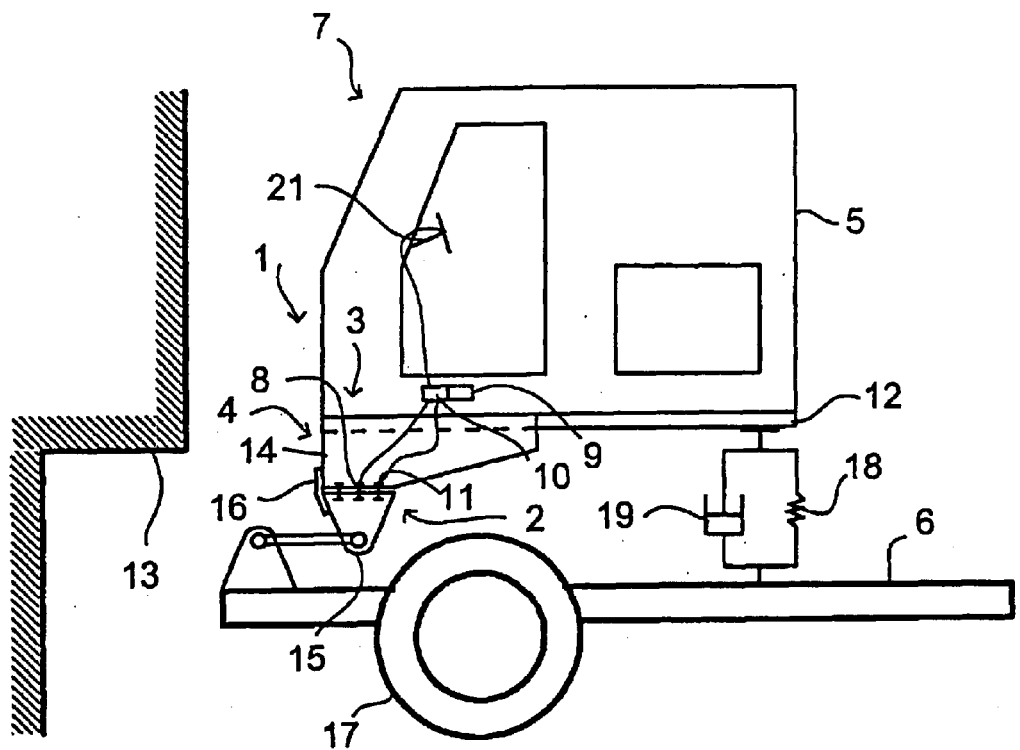
FIG. 1 shows a first embodiment of an arrangement according to the present invention for weakening a truck structure prior to collision.

FIG. 1 shows a first embodiment of an arrangement 1 according to the present invention. The arrangement 1 comprises at least one element 2, which is arranged in a structure 3. According to a first embodiment, the structure 3 is a portion 4 between a vehicle cab 5 and a vehicle frame 6, in a vehicle such as a truck 7. The element 2, which in this first embodiment is a plurality of fasteners 8, such as screws, bolts or rivets, are arranged in a portion 4 to affect its strength. A sensor 9 is disposed to sense impact, such as collision impact, against the truck 7. A control unit 10 is arranged to firstly receive signals from the sensor 9 and secondly emit a control signal when the signal received from the sensor 9 agrees with a set value. This set value is programmed into the control unit 10 and corresponds to an impact occurring in a collision. Preferably, set values corresponding to various collision situations and collision directions can be programmed in the control unit 10.

Each fastener 8 comprises an explosive charge 11 disposed to detonate when said control signal is emitted from the control unit 10. These explosive charges 11 are so arranged at the fasteners 8 that the fasteners 8 weaken the strength of the structure 3 when the explosive charges 11 detonate. The explosive substance in the charges 11 can be gunpowder, TNT or the like.

FIG. 1 shows the truck 7 prior to collision. The vehicle cab 5 is mounted on beams 12, which are joined to the vehicle frame 6 via said portion 4. FIG. 1 shows only one of the beams 12. The fasteners 8 hold the portion 4 together, so that the beam 12 and thus the cab 5, upon impact in a collision, are allowed to be displaced relative to the vehicle frame 6 when the explosive charges 11 detonate.

Figure 2:
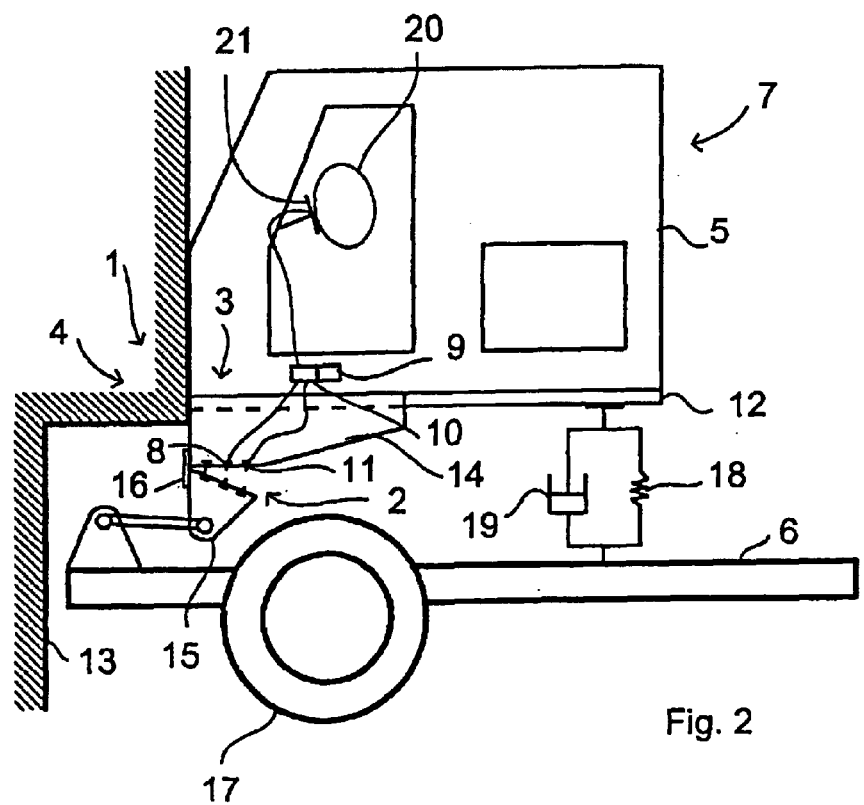
FIG. 2 shows the arrangement according to FIG. 1 after the truck has collided.

FIG. 2 shows the truck 7 of FIG. 1 after a collision with an object 13, which can be another vehicle, a barrier or the like. In a collision, the sensor 9 has detected an impact agreeing with a set value programmed into the control unit 10. The control unit 10 has then emitted a control signal to the explosive charge 11 of each fastener 8 so that all of the fasteners 8 coupled to the control unit 10 have been broken off by the detonation of the respective charges 11. The control signal is preferably an electrical signal acting on the explosive substance of the charge 11 so that it detonates. The portion 4 in the example shown in FIGS. 1 and 2 consists of two parts 14, 15, which are held together by three fasteners 8, of which two of the fasteners 8 are coupled to the control unit 10. The third fastener 8 will be deformed or broken off by the forces arising during collision and by the cab 5 being pushed backwards relative to the frame 6. A connecting plate 16 is joined to the parts 14, 15 of the portion 4, so that the cab 5 after collision is prevented from leaving the vehicle frame 6.

For the purpose of clear illustration, only the front portion of the truck 7 is shown in FIGS. 1 and 2. It is thus evident from the figures how a front wheel 17 is arranged on the frame 6 and how the cab 5, with a spring 18 and a damper 19 is suspended on the frame 6. It is also possible to combine the arrangement 1 according to the present invention with vehicle safety equipment, such as one or more collision airbags 20, as will be explained in more detail below. FIGS. 1 and 2 show how the control unit 10 is coupled to an airbag 20 arranged in a steering wheel 21. In order to absorb the energy developed during collision, an energy-absorbing element (not shown) can be arranged between the cab 5 and the frame 6. Such an energy-absorbing element can, for example, be a body part connecting a rear section and the cab 5, thereby forming a deformation zone. Such an energy-absorbing element is shown in International Patent Application No. WO-A1-0018633.

Figure 3:
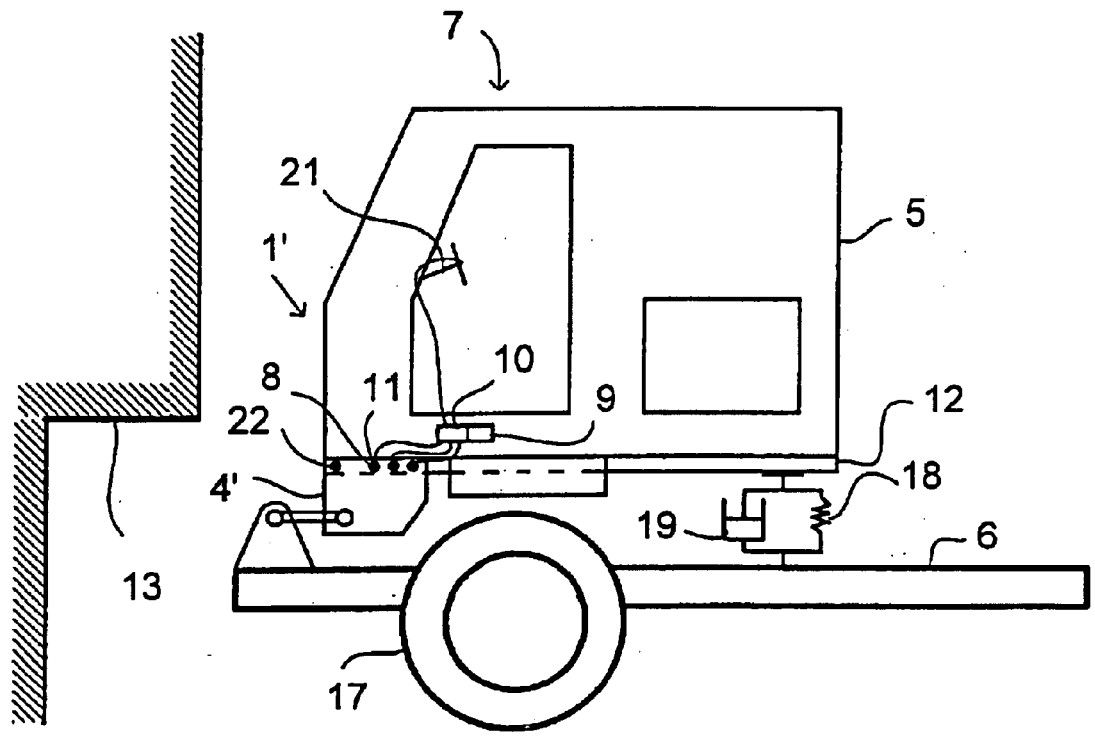
FIG. 3 shows a second embodiment of an arrangement according to the present invention for weakening a truck structure prior to collision.
Figure 4:
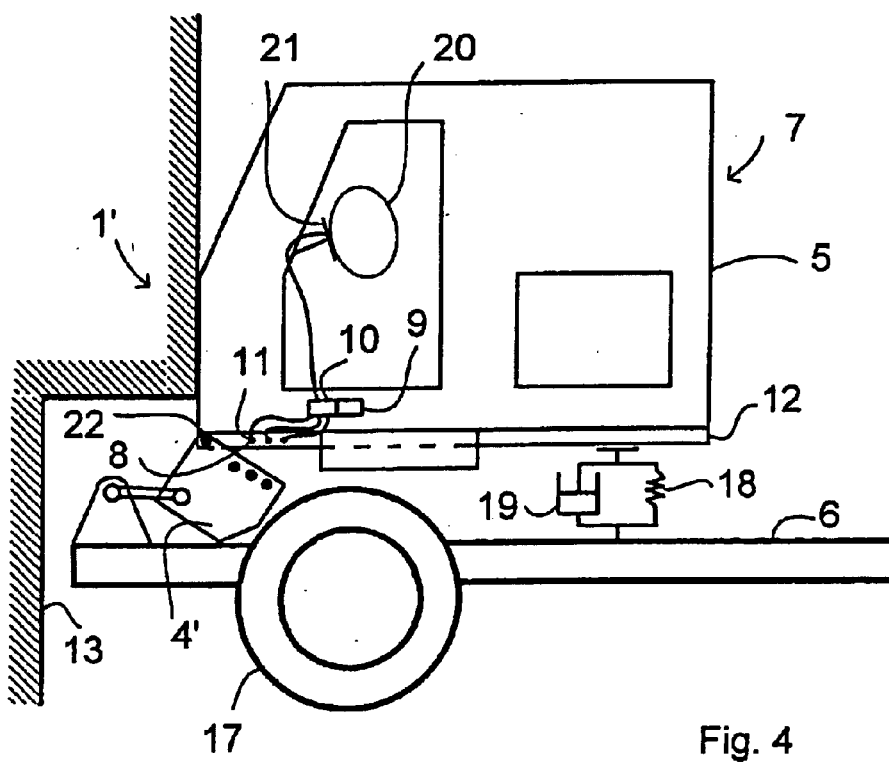
FIG. 4 shows the arrangement according to FIG. 3 after the truck has collided.

FIGS. 3 and 4 show a second embodiment of an arrangement 1' according to the present invention, which differs from that shown in the first embodiment in that the portion 4', connecting the cab 5 to the vehicle frame 6, is joined with fasteners 8 directly in the beam 12 of the cab 5. The fasteners 8 extend horizontally through the portion 4' and the beam 12 of the cab 5. In a collision the fasteners 8 break off in the same manner as was described in connection with the first embodiment, allowing the portion 4' to pivot about a joint 22 between the portion 4' and the beam 12. The cab 5 can thus be displaced rearwardly in this case as well relative to the vehicle frame 6. The arrangement 1' according to this second embodiment allows the space between the cab 5 and the frame 6 to be made smaller.

Figure 5:
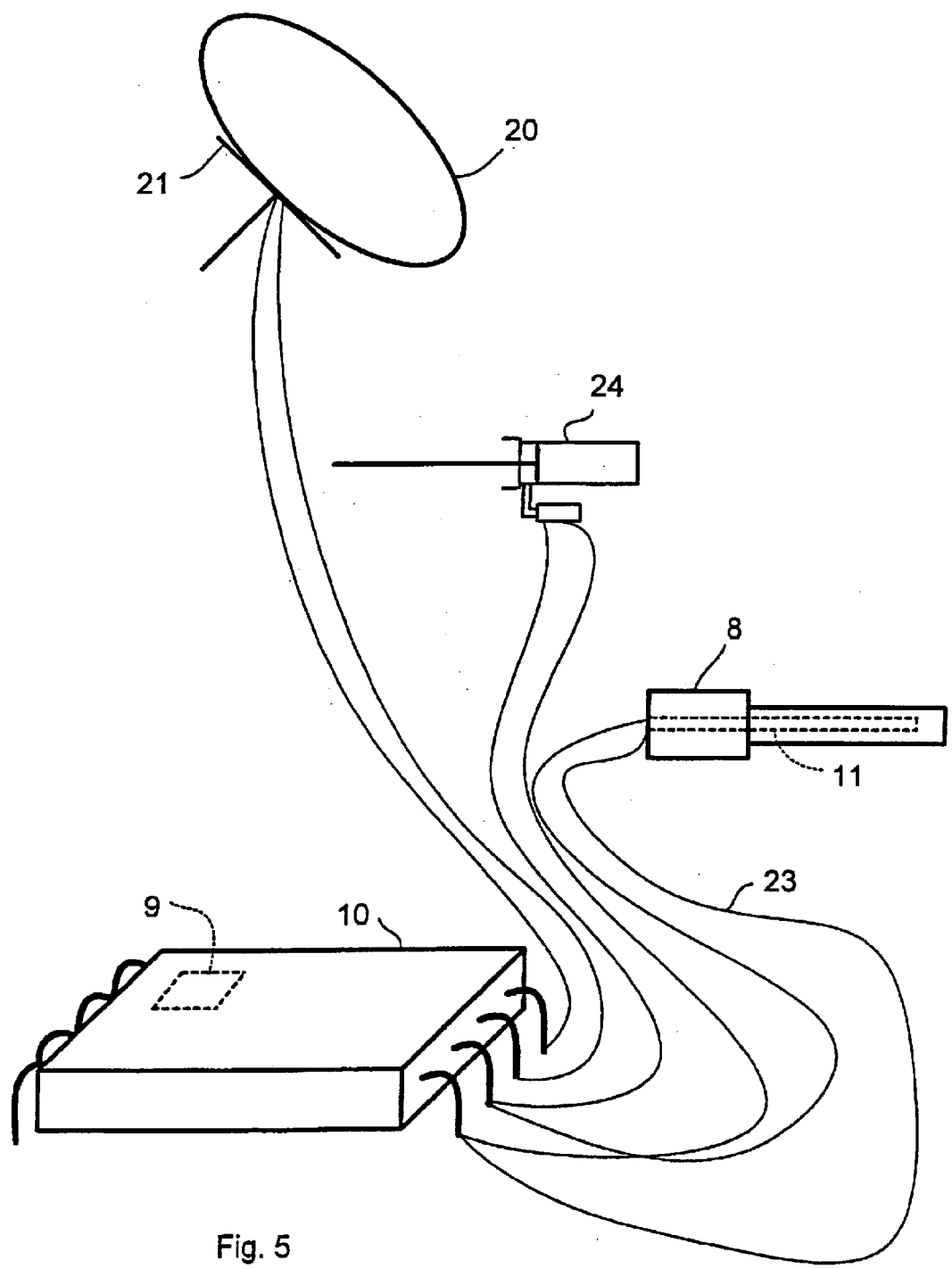
FIG. 5 shows how an arrangement according to the present invention can be combined with vehicle safety equipment.

FIG. 5 illustrates how an arrangement 1, 1' according to the present invention can be combined with security equipment for vehicles. The control unit 10 is coupled by means of electrical cables 23 to the explosive charges 11 of the fasteners 8. An airbag 20 and a belt pretensioner 24 are also coupled to the control unit 10. The belt pretensioner 24 is intended to tighten a safety belt (not shown) so that persons buckled in to the vehicle seats will not be thrown forward in a collision. The control unit 10 can simultaneously send control signals to the fasteners 8, the airbag 20 and the belt pretensioner 24, so that they are all activated simultaneously in a collision. It is also conceivable that one or more of these components 8, 20, 24 can be activated prior to the other components 8, 20, 24 in a collision. The sensor 9, which senses the impact arising in a collision, is integrated into the control unit 10 in the embodiment shown in FIG. 5.

Figure 6:
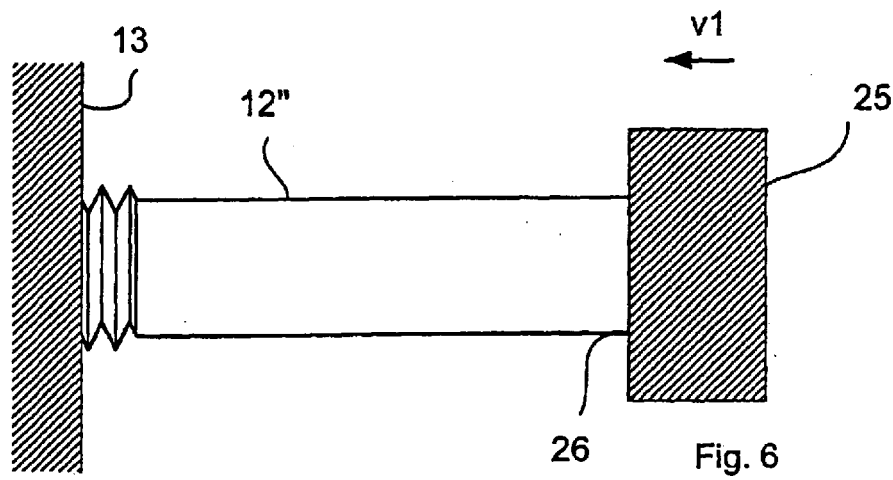
FIG. 6 shows how a beam absorbs energy in a known manner by axial compression.

Additional embodiments of the invention will be described below. FIG. 6 shows how a beam 12" absorbs energy in a known manner by being compressed axially in a collision. Such beams 12" are often present in passenger cars and are usually made hollow with a rectangular or square cross section. A body 25 having a certain mass is arranged at one end 26 of the beam 12". At the moment of collision, the beam 12" and the body 25 are moving a velocity v1. As was mentioned in the introduction to the description, such known beams 12" are, however, difficult to use in trucks 7. Certain types of trucks 7 are not provided with a deformation zone in front of the cab 5, and therefore there is no space to place one or more elongated beams 12" in front of the cab 5.

Figure 7:
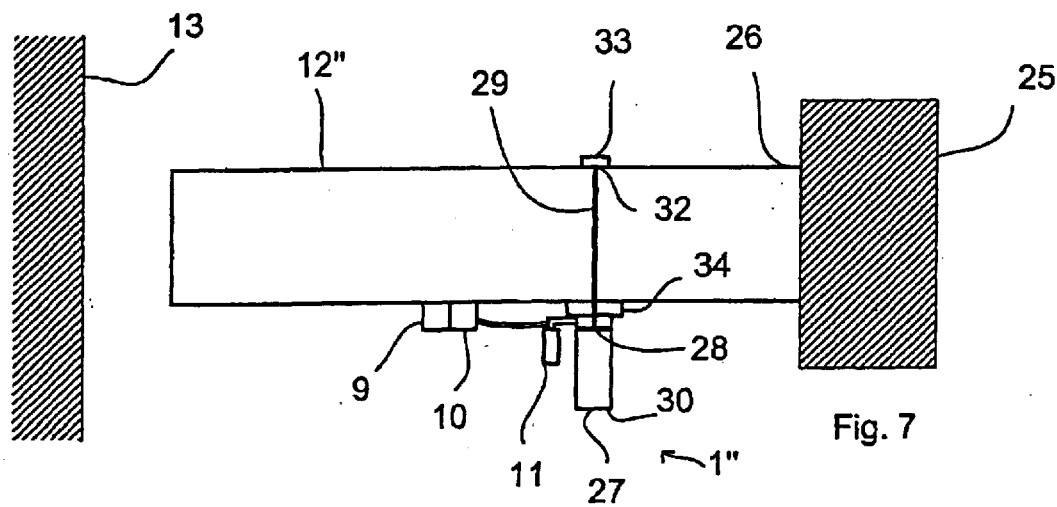
FIG. 7 shows a third embodiment of an arrangement according to the present invention for weakening a beam before the beam collides with an object.

FIG. 7 shows a third embodiment of a device 1" according to the present invention for weakening a structure in the form of a beam 12", before the beam 12" collides with an object 13. The beam 12" can have a square, rectangular or circular cross-section. The cross section can also have an arbitrary shape.

An element is arranged on the beam 12" to affect the strength of the beam 12". The element in this case is a piston 28 displaceable in a cylinder 27. An explosive charge 11 disposed next to the cylinder 27 displaces the piston 28 in the cylinder 27 when it detonates, causing a piston rod 29 joined to the piston 28 to deform the beam 12", thereby weakening it.

Figure 8:
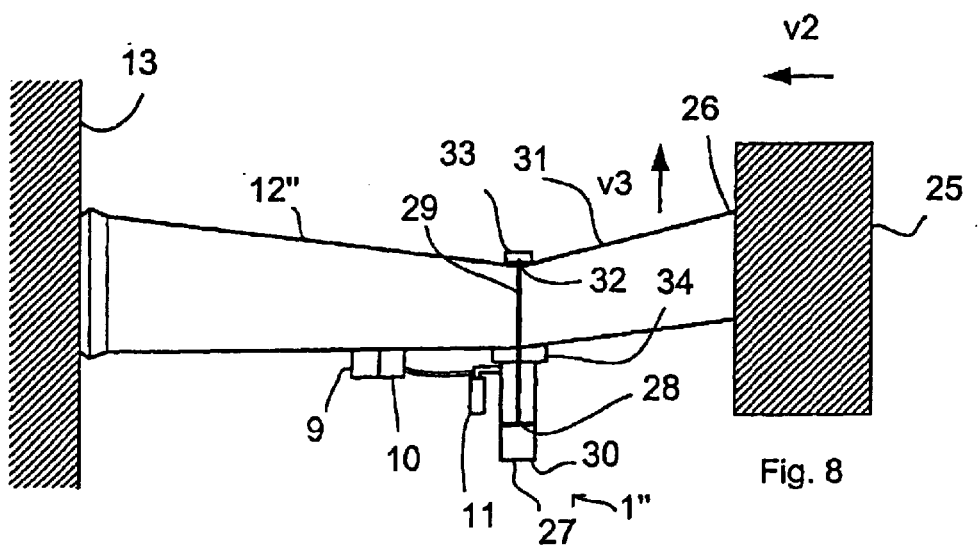
FIG. 8 shows the arrangement according to claim 7 after the beam has collided with the object.

FIG. 8 shows how the beam 12" according to FIG. 7 has collided with the object 13. At the moment of collision, the beam 12" and a body 25 connected to the beam 12" move at a velocity v2. A sensor 9 is disposed on the beam 12" to sense impact against the beam 12", and a control unit 10 is arranged to, firstly, receive signals from the sensor 9, and, secondly, to emit a control signal when the signal received from the sensor 9 agrees with a set value. The explosive charge 11 is disposed to detonate when said control signal is emitted from the control unit 10. Detonation causes gases to be pressed into the cylinder 27, moving the piston 28 towards a first end 30 of the cylinder 27. One end 32 of the piston rod 29 is joined to an anchor 33 abutting or connected to one side of the beam 12". The other end 34 of the cylinder 27 abuts against the opposite side of the beam 12". By making anchor 33 with a smaller abutment surface against the beam 12" than the second end 34 of the cylinder 27, the beam 12" will be deformed in a controlled manner. When the arrangement 1" according to the invention weakens the strength of the beam 12", the mass of the body 25 and the velocity v2 will affect a section 31 of the beam 12", bending this section 31 with a velocity v3 in a direction essentially perpendicular to the axial direction of the beam 12". Thus, a portion of the energy and force generated during collision will be diverted in another direction than the direction of travel of the beam 12" and the body 25 prior to collision.

Preferably, the deformation of the beam 12" is controlled with the aid of the piston rod 29" and the cylinder 27 to obtain a controlled absorption of the energy generated during collision. This can be achieved by adjusting the deformation of the beam 12" by the piston rod 29" and the cylinder 27 proportionally to the magnitude of the pulse generated during collision. The magnitude of this pulse is detected by the sensor 9, which sends signals to the control unit 10 to displace the piston 28 a certain distance in the cylinder 27. According to this last mentioned embodiment, a structure 3, such as a beam 12" or another mechanical element can be weakened in a passenger car, a truck, or other vehicle in order to reduce the negative consequences of a collision.

What is claimed is:

1. Arrangement for weakening a portion (4, 4') of a vehicle (7), comprising at least one element (8), which is arranged at the portion (4, 4') to affect its strength, said portion (4, 4') being disposed between a beam (12) of a vehicle cab (5) and a vehicle frame (6), said portion being joined to the element (8), so that the beam (12), and with it the vehicle cab (5), upon impact in a collision, can be displaced relative to the vehicle frame (6), characterized in that a sensor (9) is arranged to sense impact acting on the portion (4, 4'), and a control unit (10) is arranged to, firstly, receive signals from the sensor (9) and, secondly, emit a control signal when the signal received from the sensor (9) agrees with a set value, said element (B) comprising an explosive charge (11) disposed to detonate when said control signal is emitted from the control unit (10), said explosive charge (11) being arranged at the element (8) in such a manner that the element (8) weakens the strength of the portion (4, 4') when the explosive charge (11) detonates, thereby allowing the cab (5) to be displaced, by the impact generated in the collision, relative to the vehicle frame (6) when the explosive charge (11) detonates.

2. Arrangement according to claim 1, characterized in that the element consists of at least one fastener (8) joined to the structure, said fastener being disposed to be broken off when the explosive charge (11) detonates.

3. Arrangement according to claim 2, characterized in that the fastener (8) is a screw, bolt or rivet.

4. Arrangement according to claim 1, characterized in that the sensor (9) is disposed to emit signals to at least an airbag (20) arranged in at least one of a vehicle cab (5) and a belt pretensioner (24).

5. Arrangement according to claim 1, characterized in that a piston (28) displaceable in a cylinder is disposed to deform, with a piston rod (29) joined to the piston (28), a structure (12"), which is thereby weakened, by virtue of the fact that the detonation of the explosive charge (11) displaces the piston (28) in the cylinder (27).

6. Arrangement according to claim 1, characterized in that a plurality of set values, corresponding to various collision sequences, are programmed into the control unit (10).

7. Arrangement according to claim 2, characterized in that the sensor (9) is disposed to emit signals to at least an airbag (20) arranged in at least one of a vehicle cab (5) and a belt pretensioner (24).

8. Arrangement according to claim 3, characterized in that the sensor (9) is disposed to emit signals to at least an airbag (20) arranged in at least one of a vehicle cab (5) and a belt pretensioner (24).

9. Arrangement according to claim 2, characterized in that a piston (28) displaceable in a cylinder is disposed to deform, with a piston rod (29) joined to the piston (28), a structure (12"), which is thereby weakened, by virtue of the fact that the detonation of the explosive charge (11) displaces the piston (28) in the cylinder (27).

10. Arrangement according to claim 3, characterized in that a piston (28) displaceable in a cylinder is disposed to deform, with a piston rod (29) joined to the piston (28), a structure (12"), which is thereby weakened, by virtue of the fact that the detonation of the explosive charge (11) displaces the piston (28) in the cylinder (27).

11. Arrangement according to claim 4, characterized in that a piston (28) displaceable in a cylinder is disposed to deform, with a piston rod (29) joined to the piston (28), a structure (12"), which is thereby weakened, by virtue of the fact that the detonation of the explosive charge (11) displaces the piston (28) in the cylinder (27).

* * * * *